United States Patent [19]
Jones et al.

[11] Patent Number: 5,125,558
[45] Date of Patent: Jun. 30, 1992

[54] METHOD FOR WELDING COMPONENTS

[75] Inventors: Marshall G. Jones, Scotia, N.Y.; Donald R. Schindler, Burton, Ohio; Jeffrey D. Johnson, Mentor, Ohio; William O. Harris, East Cleveland, Ohio

[73] Assignee: General Electric Company, Schenectady, N.Y.

[21] Appl. No.: 622,080

[22] Filed: Dec. 4, 1990

[51] Int. Cl.$^5$ ............................................. B23K 26/00
[52] U.S. Cl. .................................... 228/179; 228/196; 228/212; 219/121.82
[58] Field of Search .................. 228/179, 180.2, 112, 228/212, 196; 219/121.64, 121.82

[56] References Cited

U.S. PATENT DOCUMENTS

| | | | |
|---|---|---|---|
| 2,953,673 | 9/1960 | Bouton et al. | 228/179 |
| 3,294,951 | 12/1966 | Olson | 228/179 |
| 3,672,047 | 6/1972 | Sakamoto et al. | 228/179 |
| 4,263,495 | 4/1991 | Fujita et al. | 219/121 LD |
| 4,291,218 | 9/1981 | Myhre | 219/121 EC |
| 4,356,376 | 10/1982 | Komanduri et al. | 219/121 LN |
| 4,524,259 | 6/1985 | Wolf et al. | 219/69 R |
| 4,542,843 | 9/1985 | Middleton | 228/112 |
| 4,564,736 | 1/1986 | Jones et al. | 219/121 L |
| 4,673,795 | 6/1987 | Ortiz, Jr. | 219/121 L |
| 4,676,586 | 6/1987 | Jones et al. | 350/96.2 |
| 4,681,396 | 7/1987 | Jones | 35/96.18 |
| 4,714,815 | 12/1987 | Swarts et al. | 219/121 LC |
| 4,799,755 | 1/1989 | Jones | 350/96.18 |
| 4,844,574 | 7/1989 | Chande | 350/96.18 |
| 4,868,361 | 9/1989 | Chande et al. | 219/121.62 |
| 4,877,175 | 10/1989 | Jones et al. | 228/102 |
| 4,907,734 | 3/1990 | Conru et al. | 228/179 |
| 4,926,022 | 5/1990 | Freedman | 219/121.63 |
| 4,935,029 | 6/1990 | Matsutani et al. | 606/223 |
| 4,948,030 | 8/1990 | Chason et al. | 228/179 |

FOREIGN PATENT DOCUMENTS 0232685 12/1984 Japan .

OTHER PUBLICATIONS

Metals Handbook Ninth Edition, vol. 6, "Laser Beam Welding", pp. 647–671, copyright 1983.

Primary Examiner—Samuel M. Heinrich
Attorney, Agent, or Firm—James R. McDaniel; James C. Davis, Jr.; Paul R. Webb, II

[57] ABSTRACT

The present invention is a method for performing a joining operation to couple a first component to a second component. One embodiment of the present method includes the steps of aligning the first component and the second component so that a first portion of the first component is aligned with a first portion of the second component, heating the first component so that a melt is formed at the first portion of the first component, and forcing the first portion of the second component into the melt so that when the melt solidifies, the first component and the second component are bonded.

11 Claims, 10 Drawing Sheets

METHOD FOR WELDING COMPONENTS

RELATED APPLICATION

The present application is related to commonly assigned U.S. patent application Ser. No. 622,037, entitled "An Apparatus For Welding Components", now U.S. Pat. No. 5,064,992.

BACKGROUND OF THE INVENTION

1. Field of the Invention

The present invention relates to materials processing and, more particularly, relates to welding components.

2. Related Art

Welding tungsten components to other tungsten components to form an assembly generally is not considered to be feasible because the welding operation itself causes severe recrystallization of the tungsten adjacent to the melted area, i.e., the weld, between and formed by the components. This recrystallization of the tungsten causes the tungsten components to become brittle and results in a weak bond. As used herein, the term "tungsten component" refers to components composed of tungsten, alloys of tungsten, tungsten alloys including a solid suspension, tungsten including a solid suspension, or any combination of materials including tungsten.

It is known to join tungsten components to other tungsten components by brazing. Particularly, the tungsten components are aligned and held in contact at a location where a bond is to be formed. The brazing metal is then melted at the location where the bond is to be formed. The brazing metal, however, typically has a lower melting temperature than the melting temperature of tungsten. As a result of the difference between the melting temperature of the brazing metal and the tungsten, a strong bond between the tungsten components and the brazing metal is not present when the components, in operation, are subjected to elevated temperatures near the braze material melting point. Brazing techniques, therefore, do not provide sufficient bond strength between the tungsten components at elevated temperatures close to the brazing material melting point. The brazing metal may also be a source of contamination in some applications.

Problems associated with welding tungsten components to other tungsten components are amplified when the tungsten components to be welded are an electrode, such as an anode, and a lead. The term "lead", as used herein, refers to an electrical conductor for conducting electricity to an electrode. The end portion of the lead which is to be bonded to the end portion of the anode typically has a very small diameter. The lead, for example, has a diameter of 0.0165 inches and the anode has a diameter of 0.040 inches. Providing a strong bond between such small working areas is very difficult.

To overcome these problems, a method for forming an anode-lead assembly by melting back the end of a lead can be utilized. The end of the lead typically is melted with a tungsten-inert-gas (TIG) welder. When the end of the lead is melted, a spherical-shaped portion having a larger diameter than the other portion of the lead is formed. Particularly, when the tungsten is melted, the melted tungsten forms into the spherical-shape due to surface tension. The spherical-shaped portion serves as an anode. In the TIG operation, it is difficult to control the diameter of the anode, i.e., the diameter of the spherical-shaped portion, being formed. Further, in some applications, the spherical-shape of the anode is unsatisfactory such as too large or of undesirable shape. For example, it may be preferred that the anode be bullet-shaped or conically-shaped.

One known technique to shape the anode formed by the TIG process is commonly referred to as electrical discharge machining (EDM). Particularly, subsequent to a TIG process, EDM techniques are used to cut the desired anode shape from the spherical-shaped portion of the melted lead. EDM techniques, however, typically require tens of minutes to complete and are too slow to be cost effectively used in mass production of such assemblies. Other techniques for shaping the anode such as machining and etching also require too much time and result in waste.

It is therefore an object of the present invention to provide a method for welding tungsten components so that a strong bond is formed between the components.

Another object of the present invention is to provide a method for welding tungsten components which does not result in damage to the components during the welding process.

Still another object of the present invention is to provide a method for welding a tungsten anode to a tungsten lead.

Yet another object of the present invention is to provide a method for welding tungsten components which facilitates mass production of welded tungsten assemblies.

SUMMARY OF THE INVENTION

One embodiment of a method in accordance with the present invention for performing a joining, or bonding, operation to couple a first component to a second component includes the steps of aligning the first component and the second component so that a first portion of the first component is disposed substantially adjacent a first portion of the second component, and heating at least a portion of the first component. As the first component is heated, a melt is formed at the first portion of the first component. The first portion of the second component is forced into and maintained within the melt. As the melt solidifies, a strong bond is formed between the first and second component.

The heating, in the exemplification embodiment, is provided by at least a first laser beam. Particularly, in the exemplification embodiment, the laser beam is a laser beam pulse emitted by a neodymium: Yttrium-Aluminum-Garnet (Nd:YAG) source and the laser beam pulse has a wavelength of 1.06 micrometers. The beam pulse is directed, for example, at a portion of the first component. The energy from the laser beam is absorbed by the first component and causes the melt to form. It is contemplated, of course, that sources of energy other than a laser can be utilized. The energy source preferably provides highly focussed energy which generates, when absorbed, localized heat in the tungsten component. The components to be welded could be composed of materials other than tungsten or some combination of materials including tungsten.

Importantly, the present method can be used to weld the small working areas of a tungsten electrode and a tungsten lead. The resulting bond is a strong bond and does not result in damage to the components. Moreover, the present method is performed relatively fast, e.g., a laser beam pulse of approximately seven milliseconds is used in the exemplification embodiment, and facilitates mass production of the anode-lead assemblies. Other advantages, which are described hereinafter in more detail, also are provided.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

Figure 1:
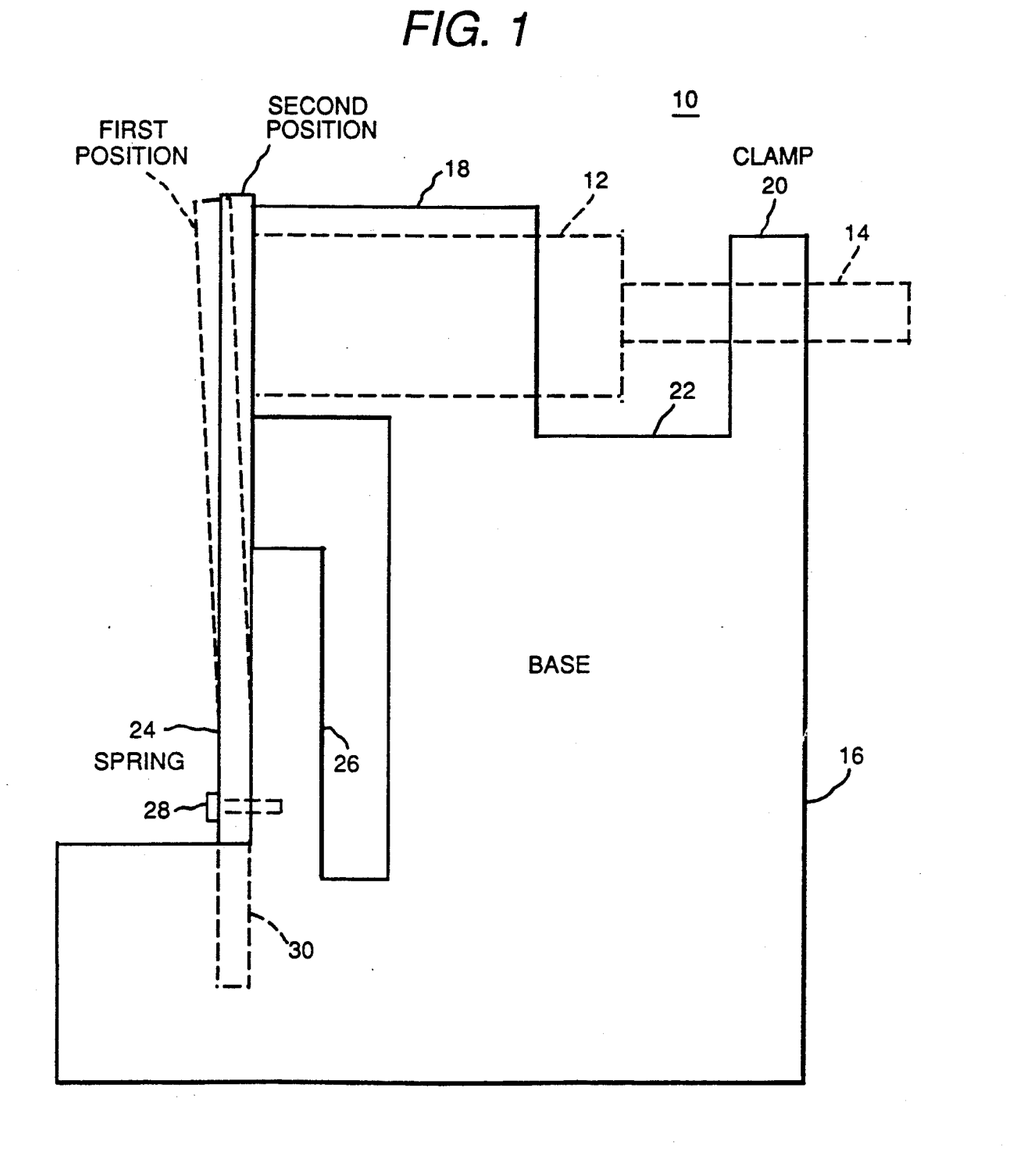
FIG. 1 illustrates a side view of an apparatus which may be used, in one embodiment, to facilitate practice of the present method.

Referring now more particularly to the drawings, FIG. 1 illustrates an apparatus 10 which may be utilized to facilitate practice of the present method. In FIG. 1, an electrode 12, such as an anode, and a conductor 14, such as a lead, are illustrated in phantom in order to better illustrate how the components are interrelated. The apparatus 10 includes a base portion 16 having a double v-groove holder 18 formed therewith. The double v-groove holder 18 is sized so that it holds the anode 12 in position relative to the lead 14 as hereinafter described. The double v-groove holder 18 allows the anode 12 to move towards the lead 14 but prevents the anode 12 from moving from side-to-side. A clamp 20 also is schematically illustrated as being integrally formed with the base 16 and is sized to hold the lead 14 in a fixed position relative to the anode 12. The walls of the clamp 20, the double v-groove holder 18 and the base 16 form a u-shaped opening 22.

A steel leaf spring 24 also is illustrated in FIG. 1. The spring 24, for example, is a commercially available steel spring which is used in a manner as hereinafter described. The spring 24 is illustrated in FIG. 1 in a first position in phantom in order to illustrate that the spring 24 actually moves during materials processing. Particularly, during processing, the spring 24 moves from the first position to the second position. A spring stop 26 is illustrated as being integrally formed with the base 16. The spring stop 26 provides support for the spring 24 and controls the magnitude of deflection of the spring 24, which in turn, controls the extent to which the anode 12 is urged, or moved, towards the lead 14. A lower portion of the spring 24 is connected to the spring stop 26 by a bolt 28 which is threadedly engaged to the spring 24 and the spring stop 26. The spring 24 also is supported by the base 16 by disposing a portion of the spring 24 within a groove 30 formed in the base 16 and sized to receive the spring 24.

Figure 2:
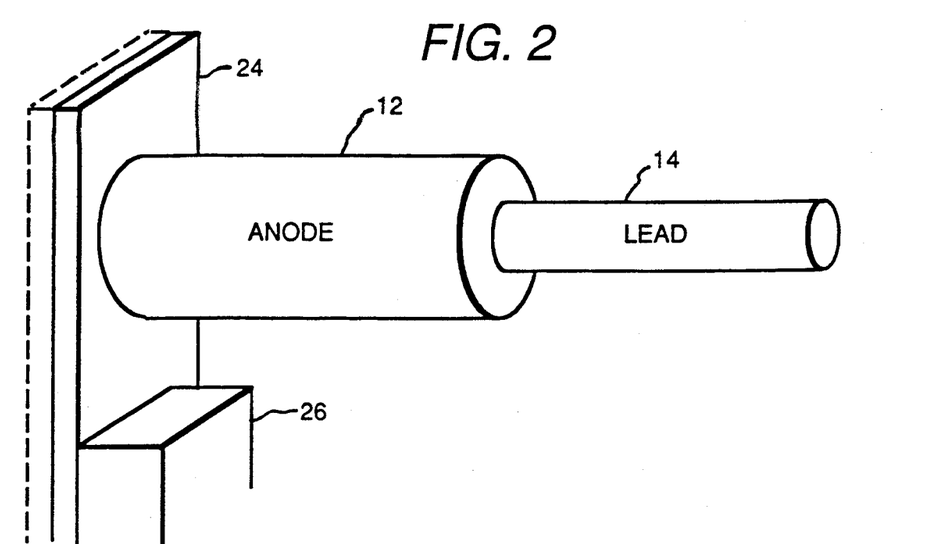
FIG. 2 is a perspective view illustrating the relative position of the anode and the lead prior to processing.

Referring now to FIG. 2, a partial schematic view of some of the components illustrated in FIG. 1 is provided. Particularly, FIG. 2 shows the anode 12 and the lead 14 as well as the spring 24 and the spring stop 26. As shown in FIG. 2, and prior to processing, the anode 12 is coaxially aligned with the lead 14, and end portions of the anode 12 and the lead 14 are brought and maintained in contact. Particularly, prior to processing, the anode 12 is placed within the double v-groove holder 18. A pin (not shown) is placed between the spring 24 and the spring stop 26 so that the spring 24 is disposed in the first position. The pin, for example, has a diameter of 0.030 inches. The end of the anode 12 then is moved into contact with the spring 24. The lead 14 then is placed in the clamp 20, and the end of the lead 14 is aligned with and disposed in contact with the end of the anode 12 to be welded to the lead 14. The clamp 20 (FIG. 1) is tightened and holds the lead 14 in a fixed position. The pin between the spring stop 26 and the spring 24 is removed and the spring 24 biases the anode 12 towards the lead 14.

Figure 3:
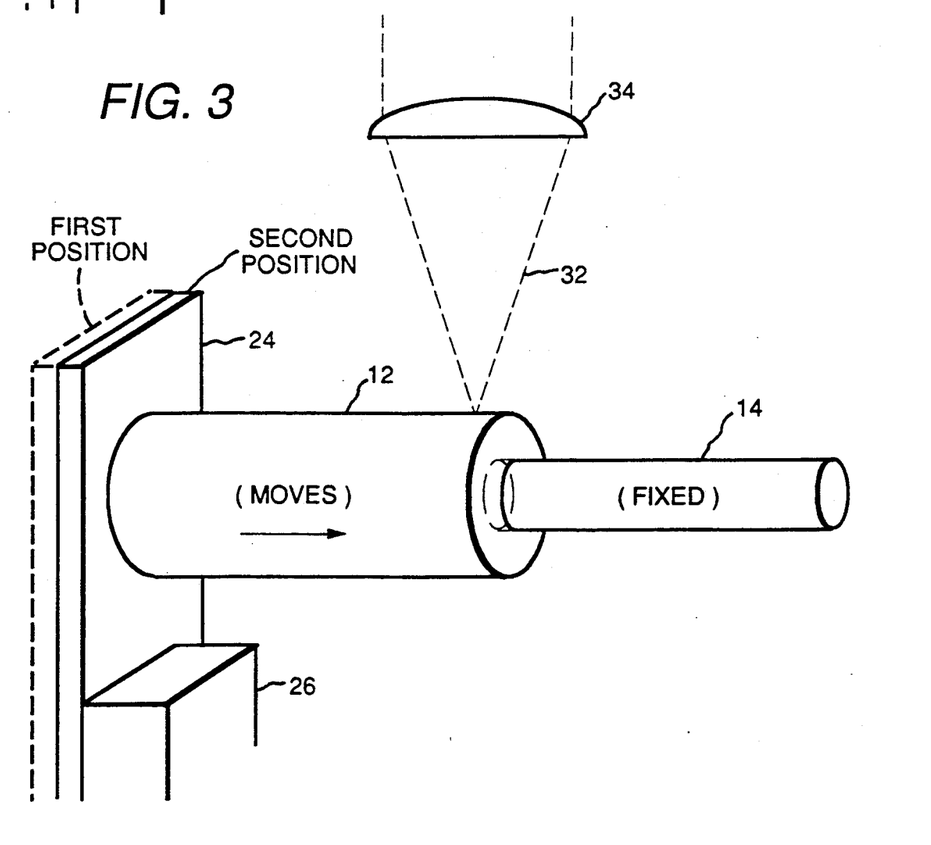
FIG. 3 is a perspective view of the components of FIG. 2 and includes illustrating a laser beam impinging on the anode during processing.

During processing, as shown in FIG. 3, a laser beam 32 focussed by a lens 34 impinges on a portion of the anode 12 adjacent to the end of the anode 12 in contact with the lead 14. The original, i.e., first, position of the spring 24 is illustrated in phantom. The laser beam 32, for example, is a 1.06 micrometer laser beam emitted from a neodymium:Yttrium-Aluminum Garnet (Nd:YAG) laser operating in a pulsed mode. An Nd:YAG laser is a source of 1.06 micrometer wavelength energy. A commercially available laser from Raytheon, including an Nd:YAG crystal rod, can be utilized, for example, as part of the laser source. The laser beam may be provided to the lens 34 directly or via an optical fiber coupled to the Nd:YAG laser source. A manner of injecting a laser beam from a laser source into an optical fiber is described in Jones, U.S. Pat. No. 4,681,396 which is incorporated herein, in its entirety, by reference. The optical fiber transmits a beam from the laser source to an output coupler or the beam emitted directly from the optical fiber is used.

The laser beam 32 impinges upon and is absorbed by the anode 12, and a portion of the end of the anode adjacent the lead forms a melt. Particularly, the energy from the laser beam 32 heats the tungsten anode 12. As the melt is forming and once the melt is formed, the force of the spring 24 forces the anode 12 to move towards the lead 14 as illustrated in FIG. 3. The magnitude of movement of the spring 24 is controlled by the spring stop 26 as hereinbefore described. The end of the lead 14 disposed adjacent the melt is forced into the melt. Particularly, although the heat causes a portion of the anode 12 to form a melt, the lead 14 remains substantially solid. The end of the solid lead 14 is forced into the melt and when the melt solidifies, a bond between the lead 14 and the anode 12 is formed.

A first interface is formed between the solidified melt and the lead 14 and a second interface is formed between the solidified melt and the anode 12. The bond strength of the second interface is stronger than the bond strength of the first interface because the cross-sectional area of the second interface is greater than the cross-sectional area of the first interface. The total strength of the entire bond, i.e., the total strength of the bonds at both the first and second interfaces, however, is strong. Further, it is believed that the first interface actually is encapsulated within the melt thereby providing even more strength to the first interface.

Although the method has been described with reference to a laser, it is contemplated that other sources of energy could be used. It is preferred that the energy source provide focussed energy so as to facilitate localized heating of the anode. Excessive recrystallization of the tungsten components therefore can be avoided. Further, it is preferred that the time required to provide the focussed energy be of short duration. Other contemplated sources of energy include, for example, electron beam sources, light beam sources, etc. The above described features of the present invention facilitate mass production of electrode-lead assemblies.

In an actual implementation of the present method, the relative displacement of the anode was controlled to be 0.030 inches. The anode had a diameter of 0.040 inches and the lead had a diameter of 0.0165 inches. A single Nd:YAG laser beam centered on the anode about 0.010 inches from the anode end adjacent the lead was utilized. The beam delivered a total of 20-30 joules to the weld zone. The pulse length was approximately seven milliseconds. The weld was made in air. It is believed that an inert or reducing cover gas would further facilitate performing the welding operation. A forming gas of 95% nitrogen and 5% hydrogen can be used, for example. Welding in a vacuum atmosphere is also believed to be helpful but would be slow because of vacuum pump down requirements.

In addition to using a single laser beam pulse, it is contemplated that using two, simultaneously-impinging laser beam pulses could be utilized. The simultaneous beam pulses could be provided, for example, by utilizing a beam splitter to split a beam emitted from the laser source and two optical fibers. Such configurations are well-known in the art. The optical fibers would be positioned so that beams emitted from the fiber ends impinge on opposite sides of the anode at approximately the same time. By using two opposed laser beam pulses, it is believed that the heating and melting around the circumference of the anode caused by the respective beams will lead to more uniform melting and better control of forming the weld.

Importantly, and as described above, the present method can be used to weld the small working areas of a tungsten components such as the working areas of an anode and a lead. The resulting bond is a strong bond and does not result in damage to the components. Moreover, the present method is performed relatively fast, e.g., a laser beam pulse of approximately seven milliseconds was used in an actual implementation, and facilitates mass production of the anode-lead assemblies.

Figure 4A:
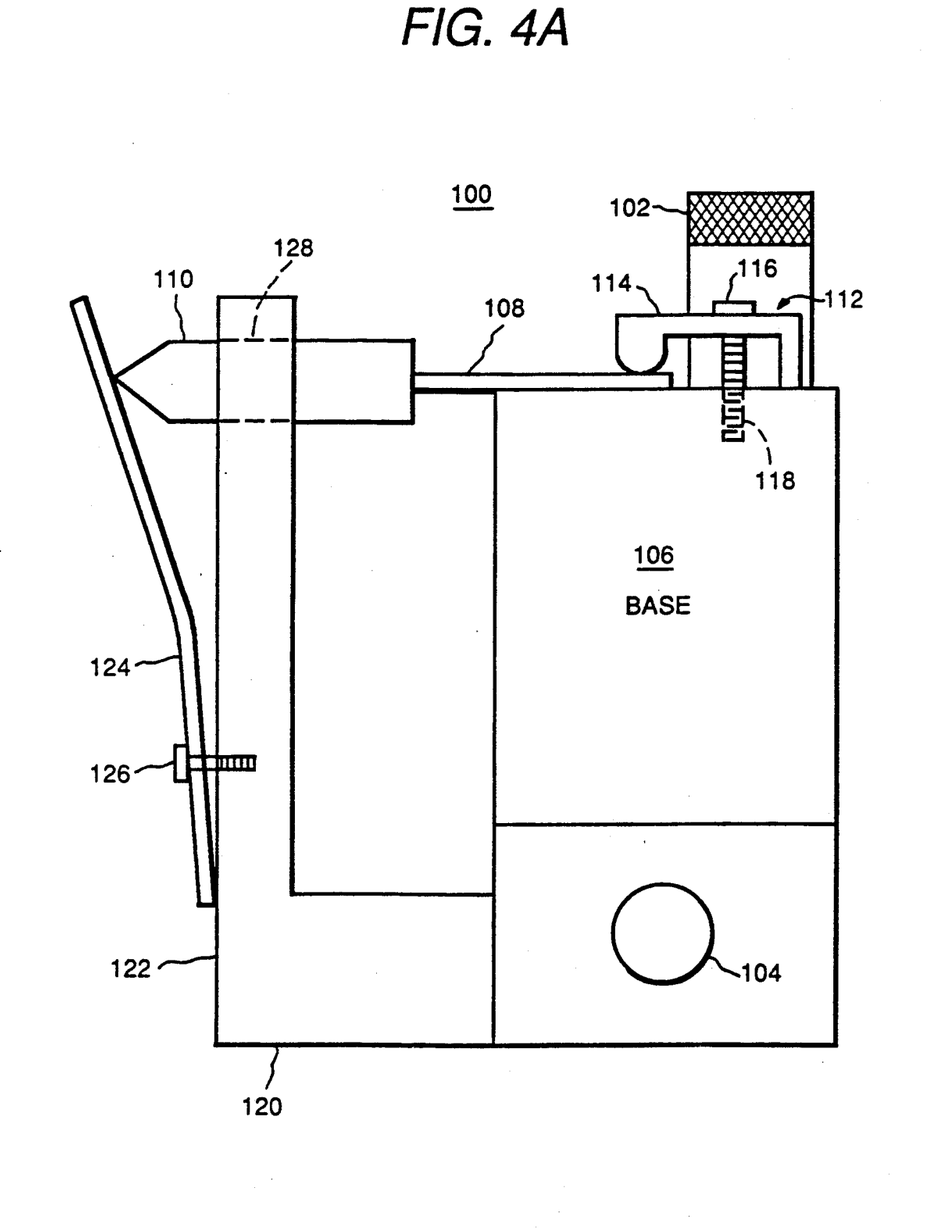
FIGS. 4A-B illustrate another apparatus which may be used, in another embodiment, to facilitate practice of the present method.
Figure 4B:
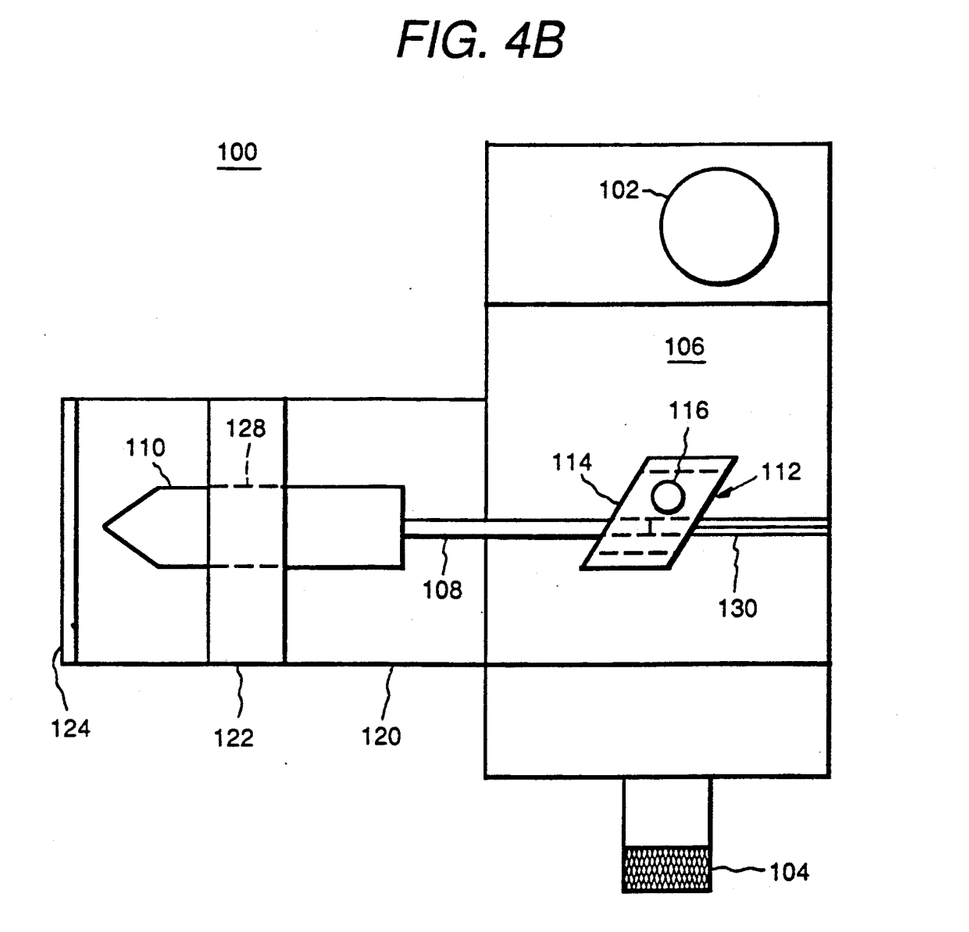

FIG. 4A illustrates another embodiment 100 of an apparatus which can be utilized in accordance with the present invention. Particularly, the apparatus 100 includes a first and a second micrometer adjustment unit 102 and 104, respectively. A base 106 is disposed and attached to the micrometer units 102 and 104. The micrometer units 102 and 104 are utilized to align a lead 108 with an anode 110 as described hereinafter in more detail. Such micrometer units are well known in the art. A lead holder 112 including a u-shaped clamp 114 and a bolt 116 is utilized to hold the lead 108 in place. The bolt 116 is aligned with and threadedly engages with an opening 118 in the base 106. An extension 120 includes an L-shaped member 122, sometimes referred to herein as the spring stop member, and a steel leaf spring 124 is engaged thereto by a bolt 126. An opening 128 sized to have the anode 110 passed therethrough is formed at an upper portion of the L-shaped member 122. A top view of the apparatus 100 is provided in FIG. 4B. As shown in FIG. 4B, the lead 108 is disposed in a v-groove 130 formed in a top portion of the base 106.

Prior to welding, a pin is disposed between the spring 124 and the member 122. The pin, for example, has a diameter of 0.030 inches and causes the spring 124 to be displaced from the member 122. The anode 110 is then disposed within the opening 128 and the end of the anode 110 is moved into contact with the spring 124. The lead 108 is then disposed within the v-groove 130 and the clamp 112 is tightened in order to hold the lead 108. The lead 108 then is disposed in a preselected position relative to the anode 110. The preselected position typically is one in which the end of the lead 108 is in contact with the end of the anode 110 where the weld is to be formed. Particularly, the micrometer units 102 and 104 are adjusted to align the lead 108 at a desired location relative to the anode 110, and the lead typically is coaxially aligned with the anode 110. Once the initial alignment is performed, then the pin is removed from between the spring 124 and the member 122. The assembly is now ready for welding. The anode 110 is spring biased towards the lead 108 and the lead 108 is maintained in a fixed position. As hereinbefore described, a laser beam then is directed at a portion of the anode 110 adjacent to where the lead 108 and the anode 110 are being maintained in contact. The lead 108 and the anode 110 are welded together as a result of this operation.

Rather than using the pin to displace the spring from the spring stop member, it is contemplated that a threaded adjustable spring stop pin could be utilized. For example, the threaded pin would be threadedly engaged to and passed through the spring stop member. One end of the pin would be in contact with the spring 124 and the other end of the pin would be exposed so that it could be screw adjusted. When it is desired to displace the spring 124 from the spring stop 122, the pin would be adjusted so that the pin extends between the spring 124 and the spring stop 122 by a desired length. Once the anode 110 and lead 108 are in place, then the pin would be adjusted so that it does not interfere with deflection of the spring 124 during operation.

Although the apparatus 100 shown in FIGS. 4A and 4B can be utilized in performing laser welding of tungsten components such as a lead and an electrode, it has been determined that the spring 124, during the welding process, actually causes the anode 110 to move somewhat out of alignment with the lead 108. More particularly, the spring 124, as shown in FIG. 4A, causes the anode 110 to not only move towards the lead 108, but also to move upward relative to the assembly 100. This upward force exerted on the anode 110 by the spring 124 causes the anode 110 to move out of alignment with the lead 108 during welding.

Figure 5:
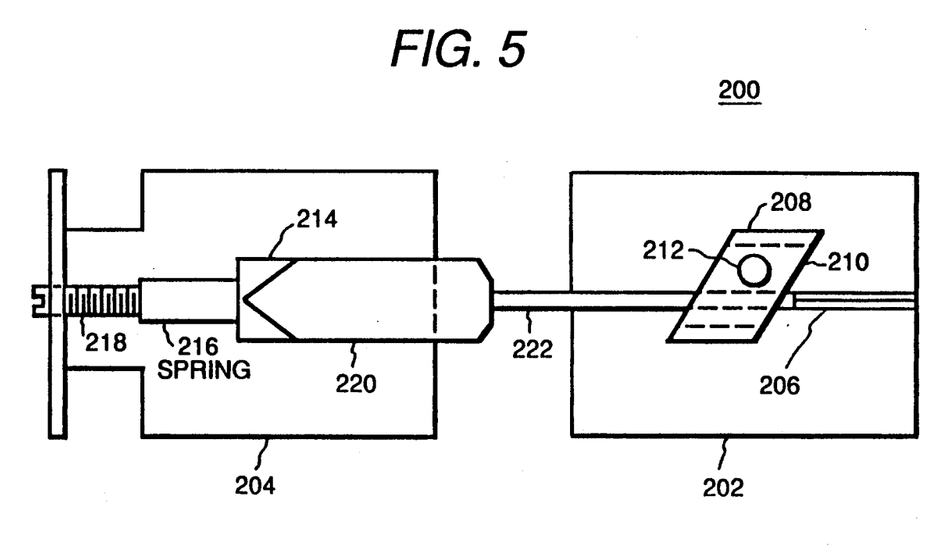
FIG. 5 illustrates still another apparatus which may be used, in still yet another embodiment, to facilitate practice of the present method.

To overcome this problem, it is contemplated that an assembly 200 as shown schematically in FIG. 5 can be utilized. More particularly, and referring to FIG. 5, the assembly 200 includes a first base 202 and a second base 204. It is contemplated that the first base 202 could be disposed on a micrometer adjustable unit such as the unit shown in FIGS. 4A-B. The first base 202 includes a v-groove 206 and a clamp unit 208. The clamp unit 208 includes a u-shaped clamp 210 and a bolt 212. The second base 204 includes an anode tip holder 214 coupled to a spring 216. The spring 216, at its other end, is coupled to a screw 218 which is used to adjust the tension of the spring 216 as is known in the art. Springs, such as the spring 216, are well known in the art. Although not shown in the schematic illustration in FIG. 5, it is contemplated that a housing could be provided in order to facilitate maintaining the spring 216 and the anode tip holder 214 in alignment with an anode 220.

In operation, the anode 220 and a lead 222 are held and maintained in alignment by the assembly 200. The lead 222 first is inserted into the v-groove 206 and disposed in a desired position relative to the second base 204. The lead 222 then is clamped and held in place by the clamp unit 208. The anode 220 then is disposed so that it is held by the anode tip holder 214. Additional housing, as hereinbefore mentioned, could be utilized to facilitate maintaining the anode 220 in position. The tension of the spring 216 is then adjusted by the screw 218 in order to control the amount of force utilized to maintain the lead 222 and the anode 220 in contact and to control the amount of relative movement the anode 220 undergoes during welding. The assembly 200 provides the advantage that the anode 220 is not forced upward during the welding process and therefore is believed to facilitate maintaining better alignment between the lead 222 and the anode 220 during welding. It is contemplated, of course, that the lead 222 could be spring-biased towards the anode 220.

Figure 6A:
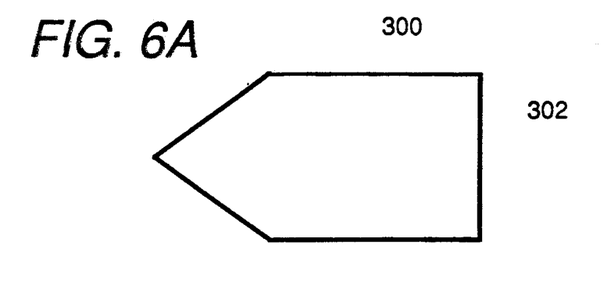
FIGS. 6A-D illustrate anode end preparation of the anode end to be welded in accordance with the present method.

FIGS. 6A-D are provided to facilitate an understanding of how the electrode end may be prepared for welding. More particularly, FIG. 6A illustrates an anode 300 which has not undergone any material preparation for welding. The end 302 of the anode 300 which is to be welded to a lead is substantially planar. If the diameter of the anode is less than, for example, 0.050 inches and if the lead to be welded to the anode is greater than, for example, 0.010 inches, then no end preparation may be necessary.

Figure 6B:
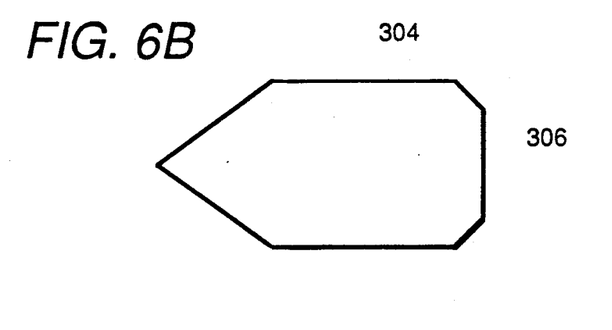

FIG. 6B illustrates an anode 304 having an anode end 306 which has been ground to reduce the diameter of the anode end 306 relative to the diameter of the anode 304. More particularly, using well-known grinding techniques or other well-known techniques, the diameter of the end 306 of the anode 304 is reduced so that less energy is required to form the weld joint between the anode end 306 and a lead. Particularly, less energy is required since less material needs to be penetrated and melted.

Figure 6C:
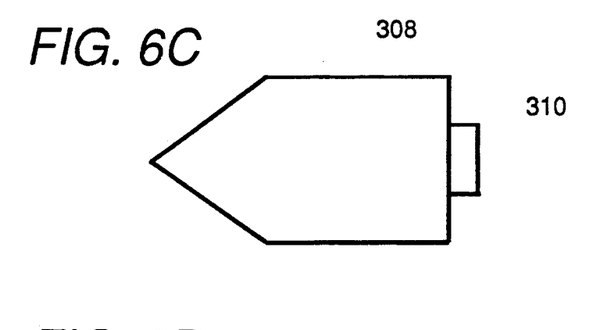

FIG. 6C illustrates an anode 308 having an anode end 310 which has been ground to even further reduce the diameter of the anode end 310 relative to the diameter of the anode 308. Even less energy is required to form the weld joint between the anode 308 and a lead.

Figure 6D:
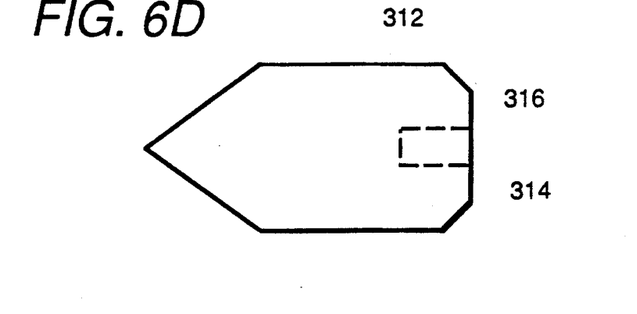

FIG. 6D illustrates an anode 312 having an anode end 314 which has been ground to reduce its diameter. A counterbore hole 316 has been formed in the anode end 314 and the hole is sized to receive a lead. The hole 316, for example, is formed by mechanical drilling or laser drilling. If the hole 316 is drilled to a sufficient depth, then it is contemplated that the anode 312 would not have to be spring biased towards the lead, or vice versa, during processing. Utilizing the counterbore hole 316 is believed to facilitate better weld characteristics, however, processing time may be increased by the amount of time required to form the hole 316.

The amount of grinding necessary, of course, depends upon the original diameter of the anode end, the diameter of the lead to be welded to the anode end, and the amount of laser energy which can be used to form the weld without damaging the anode and the lead. The amount of energy to be used and the respective diameters, of course, can be determined through experimentation.

Figure 7:
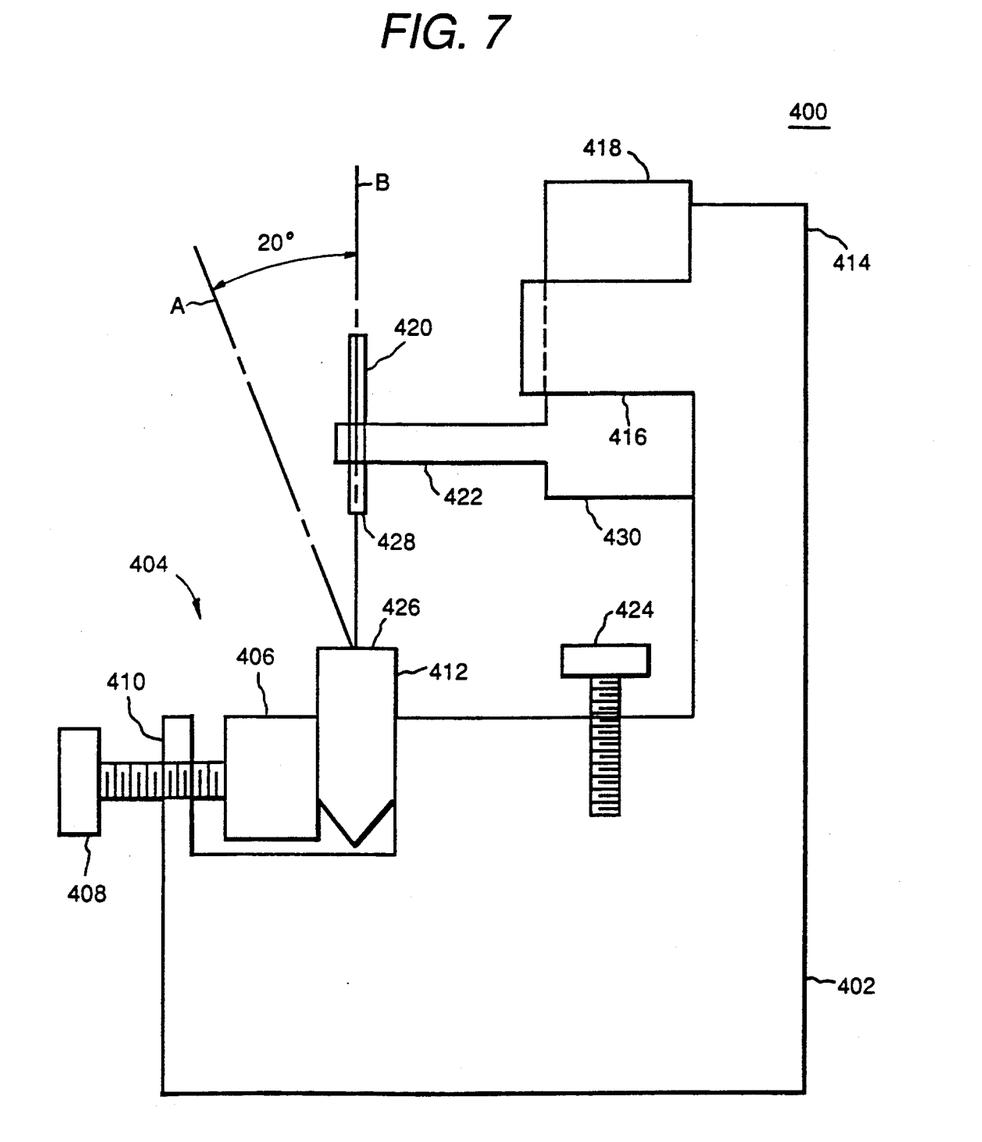
FIG. 7 illustrates still yet another apparatus which may be used to facilitate practice of the present method.

Still another embodiment of an apparatus 400 is schematically shown in FIG. 7. The apparatus 400 shown in FIG. 7 includes a base 402. A first clamp 404 is shown as being integrally formed with the base 402 and the first clamp 404 includes a clamp block 406 and a clamp bolt 408. The bolt 408 is threadedly engaged with a first arm 410 of the base 402 and the bolt 408 is rotatable relative to but coupled to the block 406. When the bolt 408 is tightened or loosened, the bolt 408 controls movement of the block 406 relative to the base 402. The block 406, for example, may be tightened so that it fixedly holds an anode 412 so that the anode 412 does not move relative to the base 402 during processing. The base 402 also includes a second arm 414. A guide 416, which is u-shaped, is shown as being integrally formed with the second arm 414, and a lead holder 418 is slideably disposed within the guide 416. A lead 420 is shown as being held within the lead holder 418 and engagement between the lead 420 and the lead holder 418, for example, is maintained be a threaded screw (not shown). More particularly, the lead 420 is inserted into and passed through an opening formed in an outer portion of a lead holder extension 422 and the screw is used to hold the lead 420 in a selected position. Rather than holding the lead 420 in a fixed position, it is contemplated that a leaf spring could be used to maintain the lead 420 in the extension 422 so that the lead 420, when it impacts against the anode 412, is allowed some limited movement. A stop pin 424 is threadedly engaged to the base 402, below the lead holder 418, and the distance which the stop pin 424 extends from the base 402 is adjustable.

In one embodiment, the lead holder 418 is biased in an "up" position, for example, by engaging a releasable spring or a mechanical arm (not shown) between the second arm 414 and the lead holder 418. Such arms/springs and their connections are well known in the art. The lead holder 418 is slideable relative to the guide 416, and the guide maintains the lead 420 in alignment with the anode 412. The illustration in FIG. 7 shows how the apparatus 400 is configured just before processing, i.e., in the "up" position.

As a first step in processing, a laser beam pulse emitted, for example, from an optical fiber coupled to an Nd:YAG source, is directed at the end 426 of the anode 412. Energy from the laser beam causes a melt to form at the anode end 426. The laser beam preferably is directed along an axis A from an angle 20 degrees from the axis B of the lead 420 as shown in FIG. 7. The amount of energy required from the laser beam pulse, of course, depends on many factors such as the focal length of lens used to focus the beam on the anode end 426, the composition of material of the anode 412, etc. The beam energy required, of course, is determined from experimentation.

Immediately after the laser beam pulse has impinged upon the anode end 426 thereby causing the melt to form, the lead holder 418 is released relative to the second arm 414 by releasing the releasable spring. The guide 416 controls side-to-side movement of the lead holder 418 and prevents side-to-side movement of the lead 420 relative to the anode 412. Gravity causes the lead holder 418 to move downward toward the stop pin 424 and the lead holder 418 impacts against the stop pin 424. The lead 420, and more particularly, the end 428 of the lead 420 which extends beyond the lower-most wall 430 of the lead holder 418 impacts upon the anode end 426 at the location of the melt. It is believed that the impact should occur within at least 3–5 milliseconds of the beam pulse. The length of the lead 420 which extends beyond the lower-most wall 430 of the lead holder 418 is determined through experimentation, for example. As the melt solidifies, a bond is formed between the lead 420 and the anode 412.

Figure 8A:
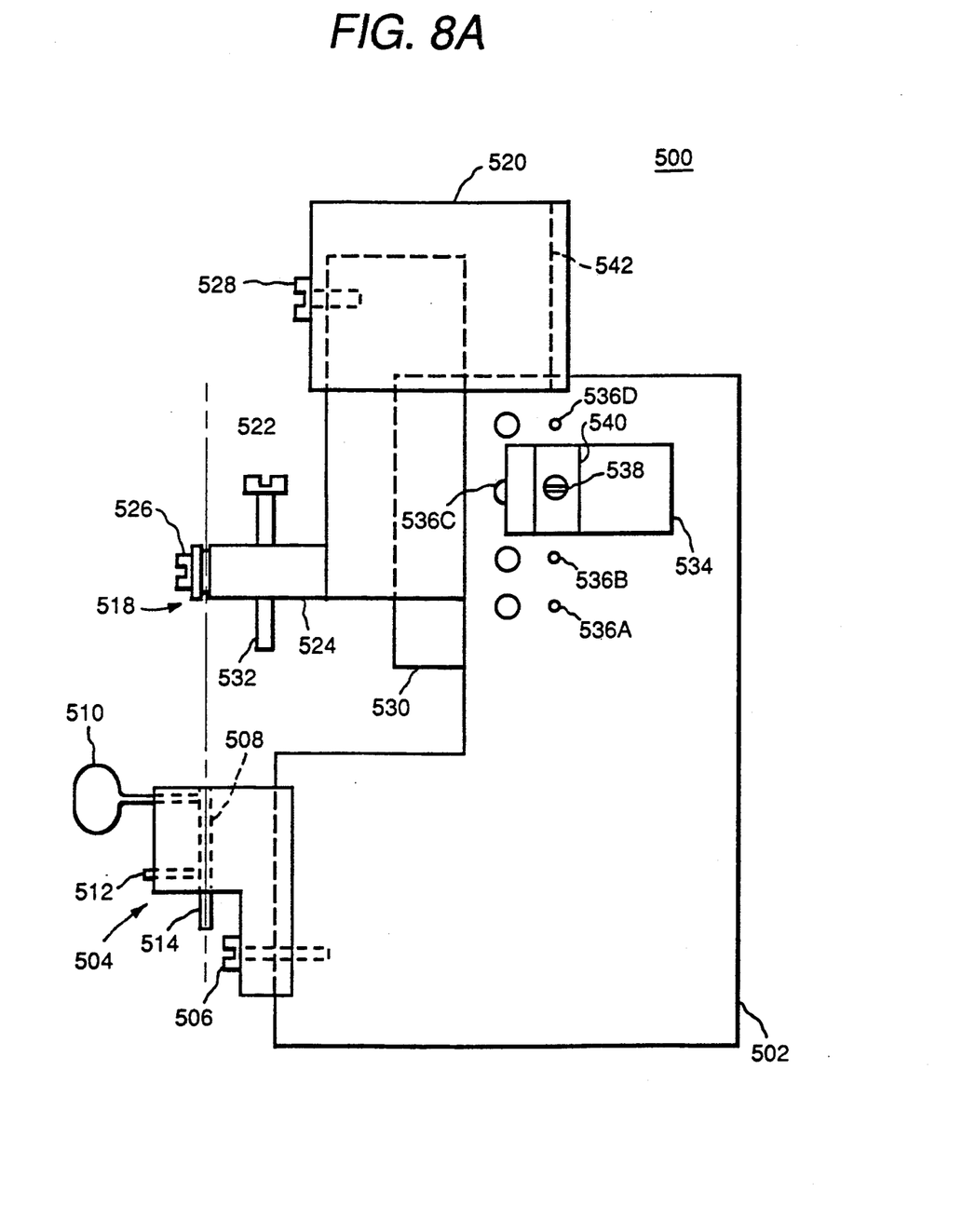
FIGS. 8A-C illustrate another apparatus which may be used to facilitate practice of the present method.
Figure 8B:
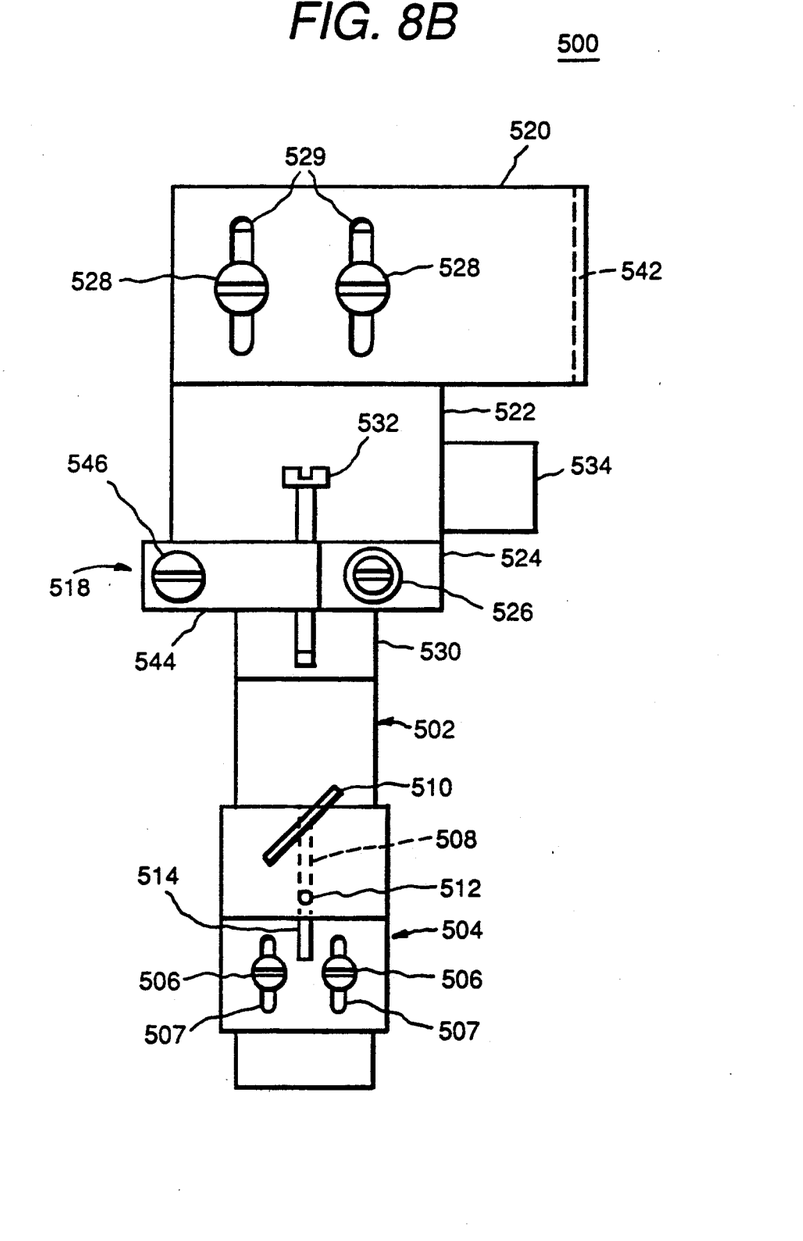
Figure 8C:
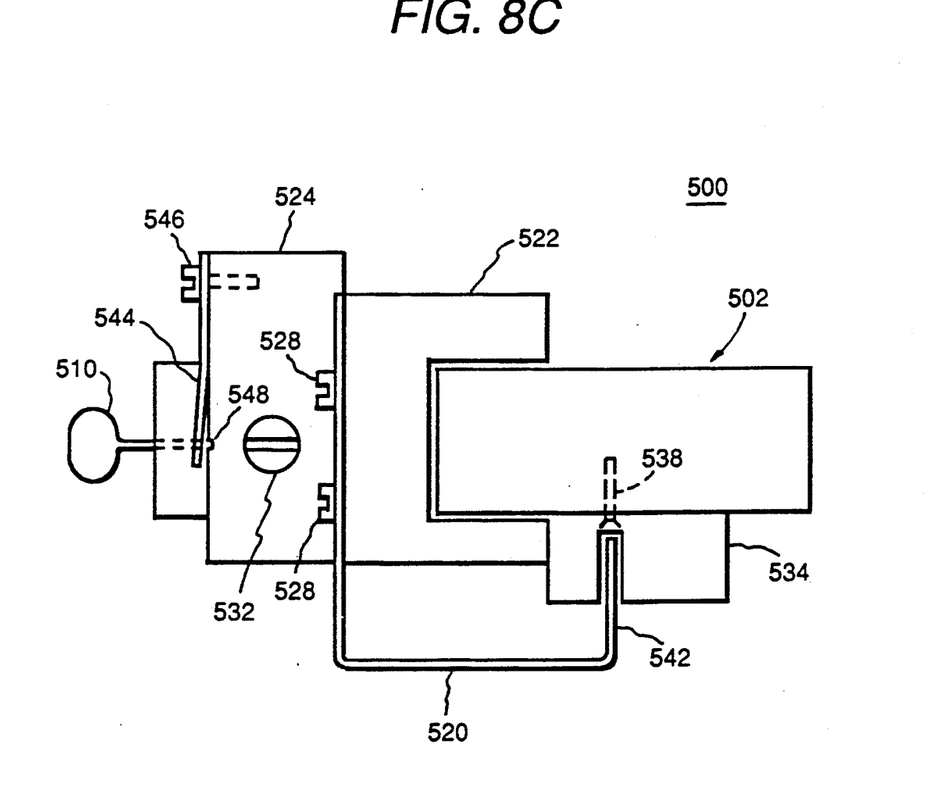

Still yet another embodiment 500 of an apparatus is schematically shown in FIGS. 8A–C. FIG. 8A illustrates a front view of the apparatus 500 which includes a base member 502 and an L-shaped electrode holder assembly 504. The holder assembly 504 is bolted to the base 502 by threaded bolts 506 (only one of the bolts 506 is visible in FIG. 8A). The holder assembly 504 is adjustable relative to the base 502 by the length of grooves 507 (FIG. 8B). The L-shaped holder assembly 504 has an opening 508 formed therein, and the opening 508 is sized, for example, to receive an anode (not shown). An electrode clamp 510 is threadedly engaged to the assembly 504 and, when tightened, extends into the opening 508 and makes contact with the anode. When sufficiently tightened, the clamp 510 holds the anode in a fixed position. A stop set screw 512 and an anode position stop 514 also extend into the opening 508 and can be used to properly position the anode and to prevent the anode from moving during processing.

The apparatus 500 also includes a lead holder assembly 518. The assembly 518 includes a flag 520, a brace 522, and an extension 524. The extension 524 is bolted to the brace 522 by a bolt 526. The flag 520 is bolted to the brace 522 by bolts 528 (only one of the bolts 528 is visible in FIG. 8A). The position of the flag 520 relative to the brace 522 is adjustable by the length of grooves 529 (FIG. 8B). The brace 522 is substantially u-shaped and is slideably engaged to a guide 530 which is bolted to the base 502 by a bolt (not shown). The assembly 518 is slideable relative to the base 502 along the guide 530. A mechanical arm (not shown), for example, could be used to releasably hold the guide in an "up" position. The assembly 518 as shown in FIG. 8A is in the "up" position. A stop screw 532 is threadedly engaged to the extension 524 and the extent to which the stop screw extends through the extension 524 can be screw adjusted. In operation, when the assembly 518 is released, the stop screw 532 impacts against the electrode holder assembly 504 to stop the downward movement of the assembly.

A photodetection unit 534 is mounted to the base. The position of the photodetection unit 534 can be adjusted by aligning the unit 534 with pairs of bolt holes 536A, 536B, 536C or 536D and bolting the unit 534 thereto. The unit 534 includes a photodetector 538 disposed in a groove 540 of the unit 534. The groove 540 is aligned with a flange 542 of the flag 520. When the assembly 518 is released from its "up" position, the flange 542 passes through the groove 540 and triggers the photodetector 538. A trigger signal from the photodetector is used to activate a laser (not shown).

As shown in FIG. 8B, a flat spring 544 is engaged to the extension 524 by a bolt 546. The flat spring 544 is used to maintain a lead in alignment with the anode disposed in the opening 508. More particularly, and as shown in FIG. 8C, the extension 524 has a groove 548 formed therein. The lead is disposed within the groove and the bolt 546 is tightened so as to tighten the flat spring 544 against the lead to hold the lead in the selected position. The lead should extend beyond the length of the stop screw 532 so that the end of the lead can impact against the anode end where the weld is to be formed.

Prior to operation, the assembly 518 is disposed in the "up" position, the anode is disposed within the opening 508, and the lead is inserted within the extension 524 as hereinbefore described. A laser is aligned so that an emitted laser beam impinges upon the end of the anode when the laser is activated. The laser beam typically impinges upon the anode end at an angle of about 20 degrees from the axis of the aligned anode and lead.

In operation, the assembly 518 is released and begins to move towards the anode holder 504. In the course of this downward movement, the flange 542 passes by and activates the photodetector 538. The trigger signal from the photodetector 538 activates the laser. The laser emits a laser beam pulse which impinges upon the anode and causes a melt to form at the anode end. About 3–5 milliseconds subsequent to activation of the laser, the lead impinges upon the anode end at the location of the melt. The end of the lead is forced into the melt. At the moment of lead-anode impact, the lead may move some relative to the anode due to the friction fit between the flat spring 544 and the lead. The lead, however, is forced into the melt and maintained within the melt as the melt solidifies. As the melt solidifies, a bond between the anode and the lead is formed.

The apparatus 500 is believed to be useful in the mass production of electrode-lead assemblies due to the automated activation of the laser and the relatively fast manner in which the weld is formed. It is contemplated, of course, that other variations of the assembly 500 could also be used in mass production of such anode-lead assemblies, and such variations are believed to be within the scope of the present invention.

While the present invention has been described with respect to specific embodiments, many modifications, variations, substitutions and equivalents will be apparent to workers in the art. It is contemplated, of course, that sources of energy other than a laser can be utilized. The energy source preferably provides highly focussed energy which generates, when absorbed, localized heat in the tungsten component. Further, the components to be welded could be composed of materials other than tungsten or some combination of materials including tungsten. Moreover, it is contemplated that the present invention could be utilized to join an electrode and/or lead to other tungsten components used for a variety of purposes. Accordingly, it is intended that the invention be limited only by the spirit and scope of the appended claims.

What is claimed is:

1. A method for joining an electrode and a lead, said method comprising the steps of:
   aligning an end of said electrode and an end of said lead;
   heating at least a portin of said electrode so that a melt is formed at said electrode end;
   forcing said lead end into said melt so that when said melt solidifies, said electrode and said lead are bonded
   maintaining said lead end in a substantially fixed position during the bonding operation; and
   biasing said electrode towards said lead end during bonding operation.

2. A method in accordance with claim 1 wherein said electrode and said lead are tungsten components.

3. A method in accordance with claim 1 wherein at least portions of said electrode and said lead have circular cross-sectional shapes and wherein aligning said electrode and said lead comprises the step of:

aligning said electrode and said lead so that the respective axes of said electrode and said lead are substantially collinear.

4. A method in accordance with claim 1 wherein said electrode end has a larger cross-sectional area than said lead end, and wherein a first interface between said lead end and said solidified melt is encapsulated within said solidified melt, a second interface between said solidified melt and said electrode end forming a stronger bond than said first interface.

5. A method in accordance with claim 1 further comprising the steps of:

maintaining said electrode end in a substantially fixed position during the bonding operation; and biasing said lead end towards said electrode end during the bonding operation.

6. A method in accordance with claim 1 wherein heating said electrode comprises the steps of:

aligning a laser with said portion of said electrode; and operating the laser so that a first laser beam pulse impinges upon said electrode portion.

7. A method in accordance with claim 6 wherein said first laser beam pulse has a wavelength of 1.06 micrometers.

8. A method in accordance with claim 6 wherein said laser comprises a Nd:YAG laser beam source.

9. A method in accordance with claim 6 wherein a second laser beam pulse impinges upon another portion of said electrode, said first and second laser beam pulses impinging substantially simultaneously upon respective portions of said electrode.

10. A method in accordance with claim 1 wherein said heating step and said forcing step are performed substantially simultaneously.

11. A method in accordance with claim 1 herein said heating step is performed immediately prior to forcing said lead end into said melt.

* * * * *